Oct. 12, 1937.  B. J. BATIE  2,095,428
POTATO DIGGER
Filed June 16, 1936  6 Sheets-Sheet 1
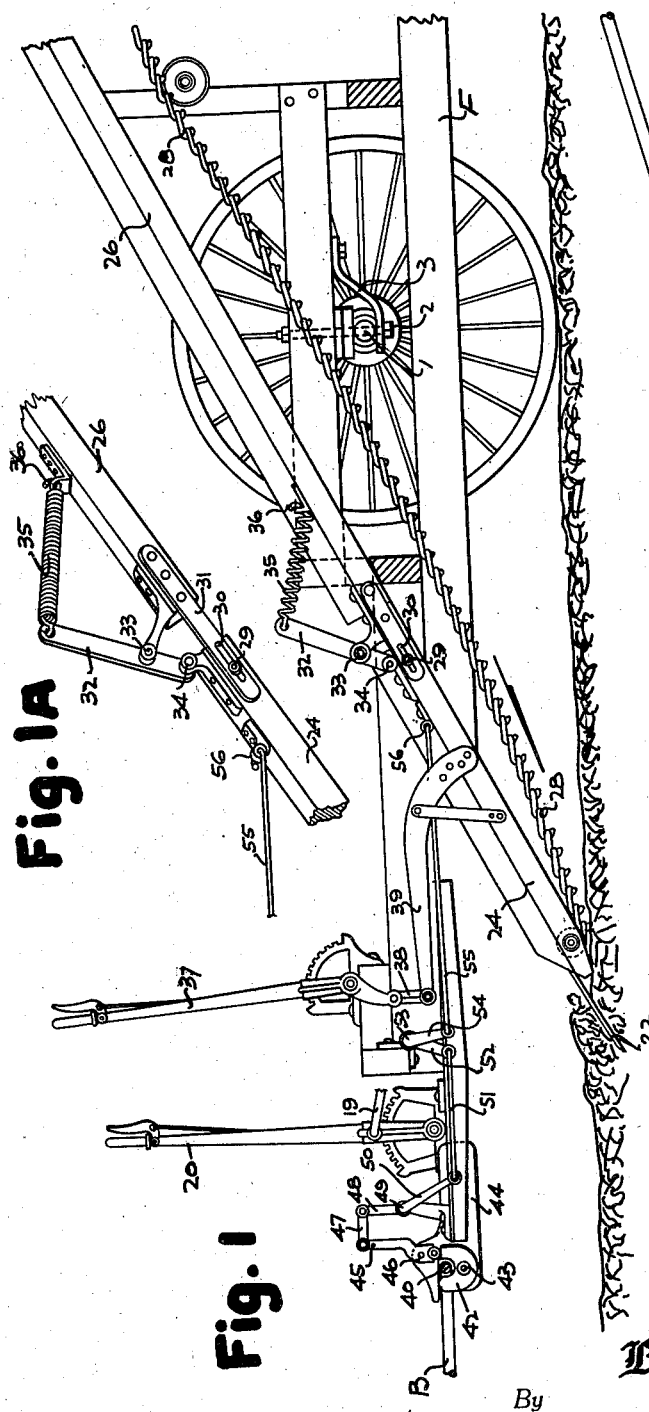
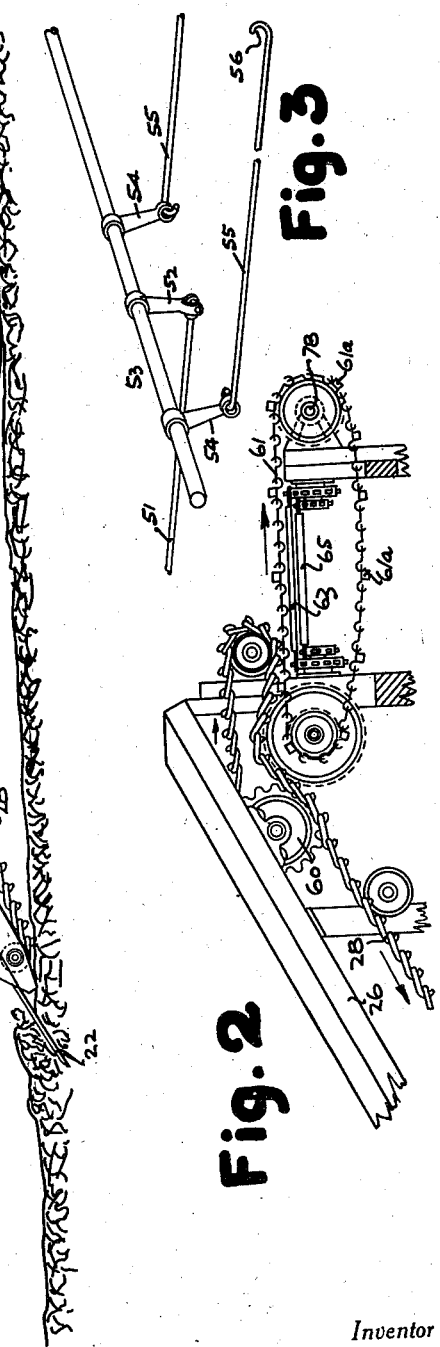
Inventor
Bert J. Batie
By Herbert E. Smith
Attorney

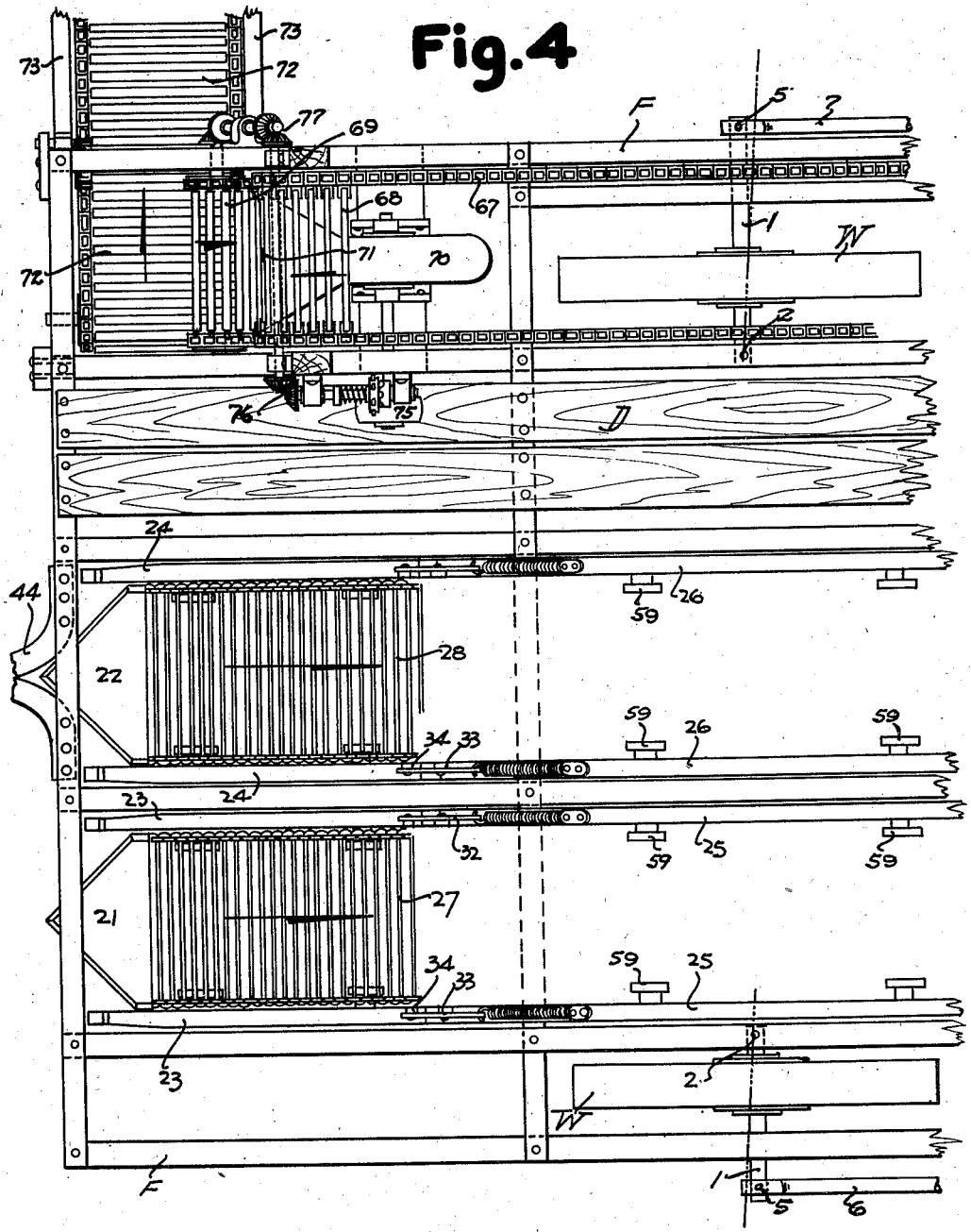

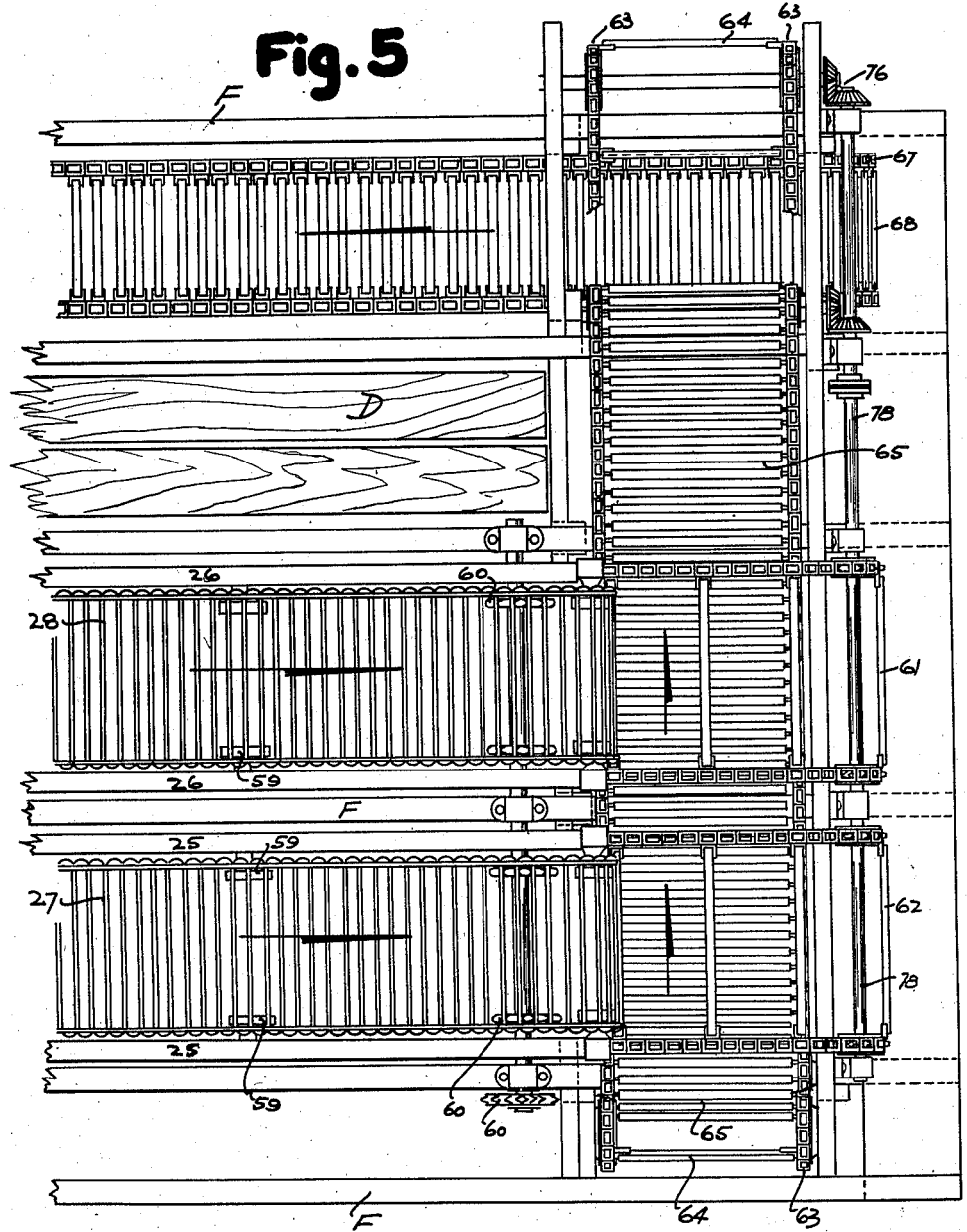

Oct. 12, 1937.　　　B. J. BATIE　　　2,095,428
POTATO DIGGER
Filed June 16, 1936　　　6 Sheets-Sheet 4
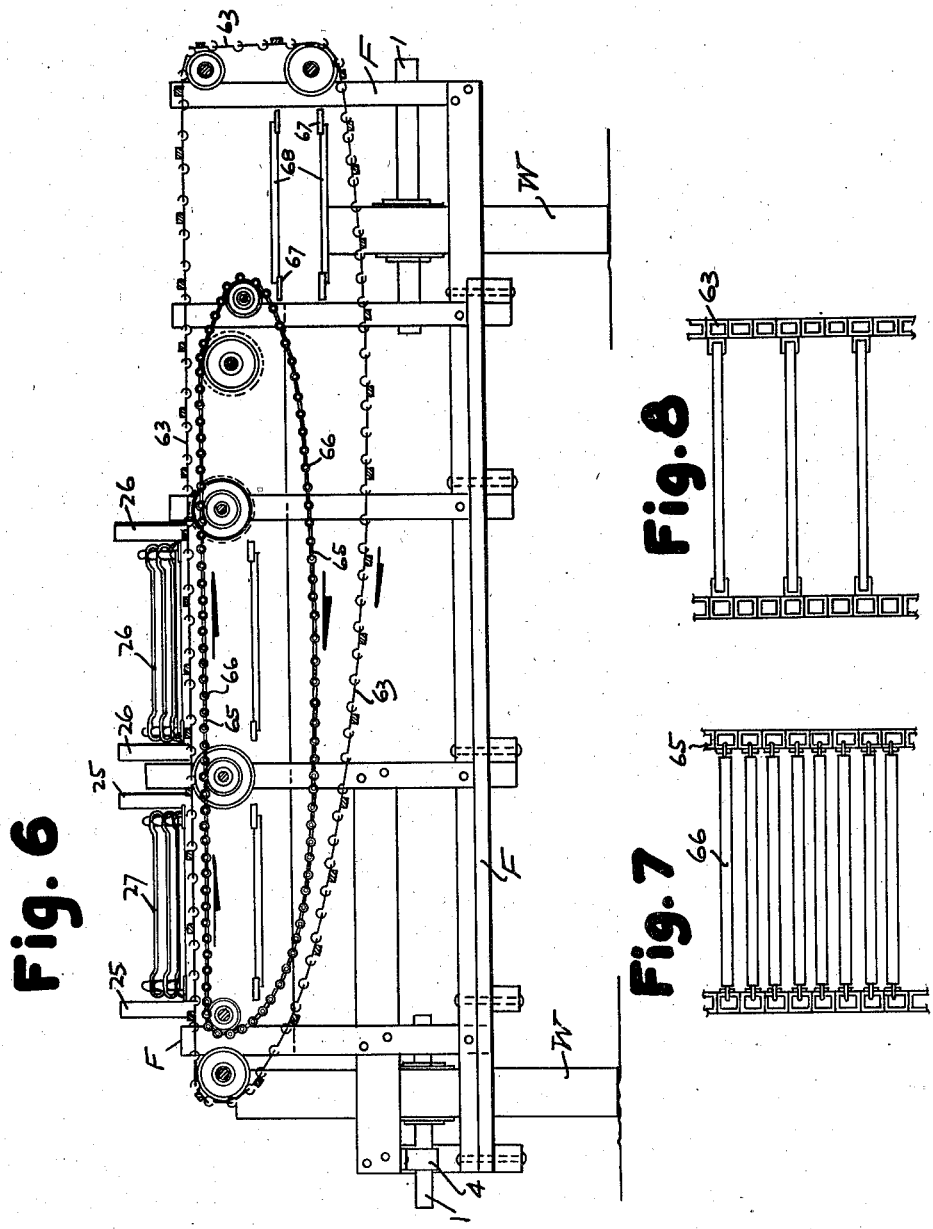
Inventor
Bert J. Batie
By Herbert E. Smith
Attorney Oct. 12, 1937.　　　B. J. BATIE　　　2,095,428
POTATO DIGGER
Filed June 16, 1936　　　6 Sheets-Sheet 5

Bert J. Batie
Inventor
By Herbert E. Smith
Attorney

Oct. 12, 1937.  B. J. BATIE  2,095,428
POTATO DIGGER
Filed June 16, 1936  6 Sheets-Sheet 6

Bert J. Batie
Inventor

By *Herbert E. Smith*
Attorney

Patented Oct. 12, 1937

2,095,428

UNITED STATES PATENT OFFICE 2,095,428

POTATO DIGGER

Bert J. Batie, Twisp, Wash.

Application June 16, 1936, Serial No. 85,507

5 Claims. (Cl. 55—51)

My present invention relates to improvements in potato diggers embodied in implements of the two-wheel type, and employing one, or more, plows or digging mechanisms for uprooting the crop from one or more hills or rows. The implement is constructed, and arranged to operate in such manner that the crop (including vines, potatoes, clods and debris) is uprooted and carried to conveyers and separators; the vines are delivered at the rear of the implement; debris is delivered at the rear end of one side of the implement; and the potato crop is collected for a side delivery at the front end of the implement to suitable receptacles, or disposed of in other suitable manner.

In carrying out my invention I preferably utilize a duplex digging mechanism which uproots the crops from two parallel rows or hills, thus increasing the efficiency of the implement by economizing in time and in the expenditure of labor; I also provide means for clearing the plows by utilizing plow frames that are adapted to recede when encountering a stationary obstruction, thereby eliminating the danger of breaking the plows or their frames, and for use in an emergency I provide a safety uncoupling mechanism whereby the implement is released from its draft-appliance to prevent damage to the implement. Other meritorious features are also embodied in the construction and operation of the implement, as will hereinafter be more fully pointed out.

The invention consists in certain novel combinations and arrangements of parts involving the construction and operation of the implement, hereinafter specifically set forth and claimed.

In the accompanying drawings I have illustrated one complete example of the physical embodiment of my invention, wherein the parts are combined and arranged according to one mode I have thus far devised for the practical application of the principles of my invention, but it will be understood that various changes and alterations may be made in these exemplifying structures, within the scope of my claims, without departing from the principles of my invention.

Figure 1 is a longitudinal sectional view at the front end of the implement showing the pivotal relation of the plow frame and the crop carrier, the automatic mechanism for emergency uncoupling of the implement from the towing appliance, and also the operating mechanism for elevating the plow and plow frame, and for adjusting these elements.

Figure 1a is a detail perspective view showing one of the flexible joints between a plow frame and its carrier frame.

Figure 2 is a detail view partly in vertical section, at the upper rear end of one of the carriers, showing the end delivery for vines.

Figure 3 is a detail perspective view showing the link and arm action of the release mechanism for the plow.

Figures 4 and 5 are top plan views, respectively, at the front and rear ends of the rectangular main frame showing the relation of the duplex carriers and co-operating conveyers.

Figure 6 is a view in elevation and partial section at the rear end of the implement, showing the arrangement of the duplex carriers and co-operating endless conveyers.

Figure 7 is a fragmentary detail plan view of one of the potato conveyers, and Figure 8 is a similar view of one of the vine conveyers.

Figure 9:
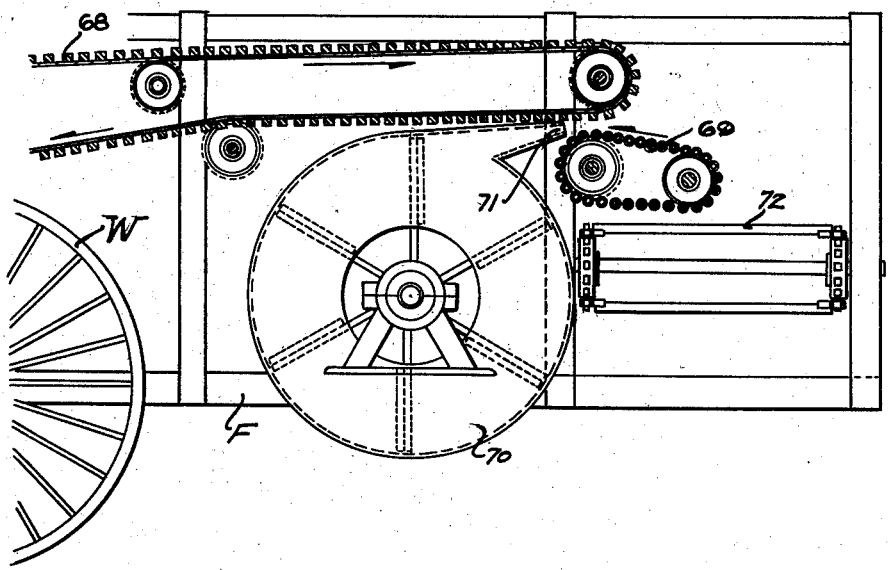
Figure 9 is a vertical longitudinal sectional view at the front of the implement as seen looking from the upper end of the sheet containing Figure 4 of the drawings.

As indicated in Figures 4 and 5 the frame of the implement designated as F is of rectangular shape, and provided with a longitudinally extending deck D at one side of its longitudinal center, for the convenience of an attendant in inspecting the work and assisting, manually, in the operation or performance of functions of the devices of the implement. The implement is preferably supported on a pair of wheels W, of the stub-axle type, arranged at opposite sides of the center of the implement and mounted to swing on pivots between this center and the wheels for facilitating steering of the implement.

Any suitable draft power, as a tractor, or horse power may be employed, and applied in Figure 1 at the draw bar B which is coupled to a draft frame 44 projecting at the front of the main frame of the implement, as will be described.

The horizontally disposed stub axles 1 for the wheels are pivoted at 2 on vertical axes with bearings 3 with slide guides 4 on the main frame, and the outer end of the axles, outside the main frame are pivoted at 5 to side links 6 and 7. These links extend rearwardly of the implement and their rear ends are pivotally connected to opposed, upper and lower crank arms 8 and 9 rigid with a rock bar 10 that extends transversely of the main frame and is journaled to rock in bearings 11. A rocking lever 12 rigid with the rock bar projects thereabove and is pivotally connected to an adjustable connecting rod 13, the pivot connection 14 being adjustable to shorten or lengthen the leverage, as indicated. At its front end the connecting rod is pivotally connected to a downturned crank arm 15 rigid with a transversely extending crank shaft 16, which is journaled in bearings 17 attached to a part of the main frame. Another downturned crank arm 18 of the crank shaft is pivotally connected at the rear end of a longitudinally extending link 19 of an operating ratchet-lever 20 standing upright in front of the main frame and supported on the draft frame 44 in position where it is readily accessible for use by an attendant in steering the wheels and holding the potato diggers or plows 21 and 22 to the respective rows or hills from which the crop is uprooted.

These duplex plows or diggers are spaced apart to conform to the width between the two rows or hills, and as indicated the plows are metal plates of rectangular shape, and pointed at the front edge to enter the hill to the required depth for uprooting the potatoes and vines. Each plow is rigidly mounted at the lower, front end of a plow frame as 23, 24, and these frames form the front portions or extensions of a pair of carrier frames 25 and 26. Endless carriers 27 and 28 of the chain type operate between the front ends of the plow frames and the rear, upper ends of the carrier frames, to receive the plowed crop from the plows and elevate and convey the crop toward the rear of the implement.

The frames of the carriers are each provided with a flexible pivot joint on pairs of axially alined pins 29, each pin being rigidly mounted on a plow frame and passing through a slot 30 fashioned in the lower end of a pivot plate or hinge plate 31, the upper end of which plate is rigidly fastened to the lower end of a carrier frame, as 25 and 26.

The plow frame, with its plow, in each instance, is permitted to have a limited swinging or pivotal movement on the pins 29 to compensate for the varying degrees of resistance encountered by the plow as the latter passes through the hill or row, and for this purpose each joint between a plow frame and its carrier frame is provided with a compensating lever 32, which is fulcrumed at 33 on the carrier frame, with its shorter arm hinged at 34 to the plow frame, and a tension spring 35 connects the longer arm of the lever at 36 to the carrier frame.

In addition to the above functions of this pivotal arrangement or flexible joint between the plow frame and the carrier frame, the plow frames may each be adjusted on their pivots with relation to the carrier frame for adjusting the depth of the digging plows, and also for the purpose of elevating the plow frames with their plows to inoperative position when the plows are not required for use, as for instance when transporting the implement to and from the potato field.

For elevating the plow frames I employ a ratchet, hand lever 37 of well known type that stands upright at the front of the implement for ready access by the attendant. This lever has a link 38 pivoted to an arm 39 rigid with the plow frame, and it will be apparent that the lever may be shifted in well known manner to adjust the plow frame through the link and arm, as described.

These pivotal joints between the plow frames and their carrier frames, also permit, in an emergency, relative movement of the plow frame to "back up" or recede, for the purpose of clearing the plow from a stationary obstruction, the receding movement being permitted by the slotted arrangement with the pivotal pin at the joint. This receding movement of the plow frame is utilized for the purpose of quickly detaching the implement from its towing power, or horsepower, thereby stopping the movement of the implement to prevent breaking of the plow or of its accessories.

In Figure 1 it will be seen that the draw bar B of the towing appliance is provided with a T-head coupling member 40, which is seated in the recesses of a pair of U-latches 42 that are pivoted at 43 near the front end of the draft frame 44, which latter frame is rigid with the front end of the main frame of the implement. Each of the U-latches is locked in upright, coupled position, as indicated, by means of a locking detent 45, located above the latch, with its lower end bearing on the upper part of the latch, and this detent is pivoted at 46 on a bracket of the draft frame, to swing free of and release the latch. A link 47 connects the upper end of the pivoted detent with a crank arm 48 fulcrumed at 49 on the draft frame 44. This crank 49 has a second crank arm 50, which is pivotally connected by a long link 51 with a rock arm 52 of a transversely disposed rock shaft 53 which is journaled to oscillate or rock in bearings mounted on the front of the main frame. This rock shaft 53 extends across and in front of both plow frames 23 and 24, and it may be rocked by movement of either of the frames. In Figure 3 the operative connection to one plow frame is shown by the use of a pair of parallel rock arms 54 depending from the rock shaft 53, and hook-links 55 extend rearwardly from the rock arms to and are fastened at 56 on the plow frame, in Figure 1.

Thus it will be apparent that a receding movement of the plow frame will pull back on the links 55, rock shaft 53, and through the linkage 51 and leverage actuated thereby, the detent 45 is freed from the U-latch 42, and a draft-pull on this latch, through the bar B and its head, swings the latch forward in Figure 1 to release the draft bar, leaving the implement stationary.

As indicated in Figures 1 and 2, the endless-chain carriers 27 and 28 rising from the rear of the plows in the direction of the arrows in Figures 4 and 5, carry the uprooted crop upwardly and to the rear of the implement. These endless-chain carriers are supported by suitable guide rollers 59 journaled in the frame portions of the carriers, and the endless carriers are operated through sprocket-chain drives, as indicated by the sprocket wheels 60.

At their rear upper ends, these elevating carriers discharge the whole of the uprooted crop, potatoes, vines, and debris, on two end-delivery conveyers 61 and 62, which, as best seen in Figure 2 are comparatively short endless conveyers alined with the carriers, but located just below the discharge ends of the carriers. These short conveyers 61 and 62 have widely spaced slats 61a that are sufficiently close to engage and convey the vines falling thereon, and to deliver these vines at the rear of the implement. But the slats 61a are spaced apart sufficiently to permit the potatoes, clods and and other loose debris to fall through these end-delivery conveyers for the vines.

After the vines are separated from the potatoes and debris, the latter, falling through these end-delivery conveyers, are deposited on a laterally moving, endless chain conveyer 63, which extends transversely of the implement, and is provided with comparatively wide-spaced cross slats 64. These slats are spaced sufficiently close to catch and retain the debris falling thereon from the two carriers, and this debris is delivered at the side and rear of the implement, as the conveyer travels over its sprocket wheels 60 and guide rollers 59.

The potatoes falling from the carriers, through the end-delivery conveyers for the vines, and also through the side-delivery conveyer 63 for the debris, are deposited on a potato-conveyer 65 of the endless chain type. As indicated in Figure 7 the slats 66 of this conveyer are closely spaced to carry the potatoes, and as seen in Figure 6 this potato conveyer is mounted parallel with the conveyer 63, with its upper working flight directly under the upper working flight of the conveyer 63, and the potato conveyer, throughout its full length, is in position to receive the potatoes as they fall through the debris conveyer.

The debris conveyer, with its upper working flight, as seen in Figure 6 extends to the extreme side of the implement, but the potato conveyer at its delivery end terminates a distance within the side of the frame F. The delivery end of the potato conveyer 65 terminates just above one side of a longitudinally extending, endless-chain conveyer 67, with its slats 68 closely spaced, similar to the transverse, potato conveyer 65, and the working flight of this second potato conveyer 67 moves from the rear of the implement toward the front thereof, and at the outer side of the deck D, so that the attendant on the deck may inspect the potatoes, and if necessary cull defective ones, or remove debris.

Figure 10:
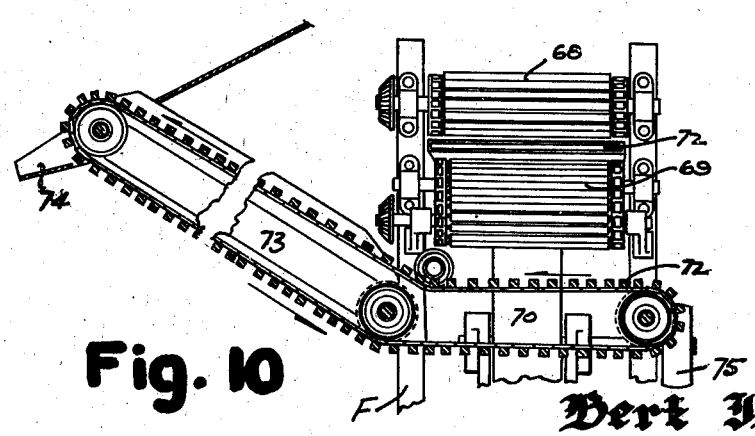
Figure 10 is a detail front elevation looking at the upper left hand corner of the implement in Figure 4.
Figure 11:
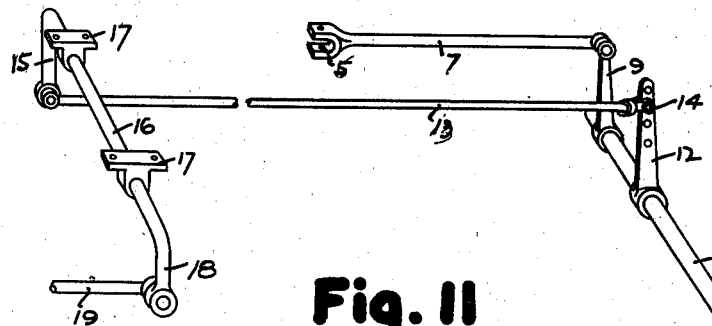
Figure 11 is a detail perspective view of the rigging for steering the wheels of the implement.
Figure 12:
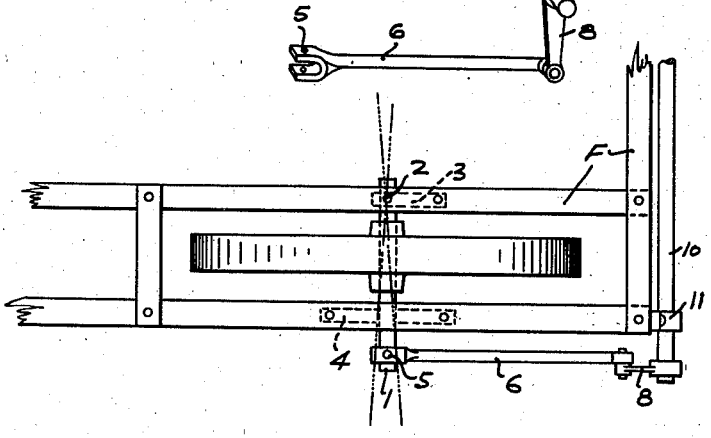
Figure 12 is a detail plan view of one of the two wheels of the implement and accessories.

As best seen in Figures 9 and 10, the second potato conveyer 68 delivers the potatoes at the front right hand corner of the implement, but before delivery of the potatoes a final separation of debris from the potatoes is accomplished in order that the crop may be collected in comparatively "clean" condition.

Just below the front delivery end of the potato conveyer 68 is arranged a short, endless chain conveyer 69 passing over suitable sprockets, and as indicated in Figure 9 by the arrows, this conveyer 69, moves with its working flight traveling in direction opposite to the movement of the working flight of the conveyer 68, and it will also be seen in Figure 9 that the working flight of the short conveyer declines away from the conveyer 68. This opposed movement between the two conveyers, and the declination of the working flight of the short conveyer causes a tumbling, or agitation of the potatoes as they are delivered to the conveyer 69, and the potatoes tumble, by gravity, down the inclined short conveyer. This tumbling or agitation of the potatoes serves to free therefrom soil, clods, and other debris, and to further effect separation of these undesirable elements from the potatoes, a blast of air is blown through the intervening space between the end of the conveyer 68 and the working flight of the short conveyer 69, which blast of air blows the debris free from the potatoes.

The air blast is provided by the use of a fan blower mounted in the fan casing 70, and this casing has a delivery or discharge nozzle 71 pointed toward the space between the conveyer 68 and conveyer 69. This fan blower of the lateral intake and peripheral delivery type is mounted in the main frame F, and of course the blast is controlled by suitable means to blow the dust and debris from the potatoes, and to some extent the blast aids in tumbling the cleaned potatoes along the conveyer 69.

As the cleaned potatoes tumble from the conveyer 69 they fall upon a transversely extending, discharge-conveyer 72, and as indicated in Figure 10 this discharge conveyer has an upwardly inclined leg 73 which elevates the potatoes and discharges them into a chute 74 where the potatoes are handled as desired.

The various conveyers, other operating parts, and the fan blower may be furnished with power in any suitable manner, as by a motor mounted on the implement, and suitable transmission mechanism is provided for the sprocket-chain drives to the fan pulley 75, to bevel gear couples as 76 and 77, and to the various sprocket shafts 78 for the operating sprocket wheels of the conveyers. The movement of the crop, by the various conveyers, is indicated by the arrows in Figures 4 and 5, and it will be understood that the required attendants, such as a "driver" of the implement, and an inspector or inspectors will stand on the deck D, or on the draft frame or platform, for control of the implement and for control of the harvested crop.

It will be understood that the construction and operation of the duplex plows or diggers are similar, and the full description of one will suffice for both, and it will be further understood that only one plowing mechanism may be employed, instead of two as indicated.

Having thus fully described my invention, what I claim as new and desire to secure by Letters Patent is:—

1. In an implement as described, the combination with draft means, and digging mechanism including a flexibly jointed frame wherein the plow portion of the frame is adapted to recede, of coupling means, and power-transmitting mechanism between the plow portion of the frame and the coupling means, whereby the coupling is released by recession of the plow frame.

2. In a potato digger, the combination with draft means and digging mechanism including a plow and plow frame, a carrier frame forming an extension of the plow frame, and a carrier supported on both frames, there being a jointed connection between said frames to permit recession of the plow frame, of coupling means for co-action with the draft means, and power transmitting mechanism between the plow frame and the coupling means for releasing the latter.

3. In an implement of the potato-digging type, the combination with draft means, a coupling device for said means and implement, a stationary carrier-frame, a movable plow frame, and a slot and pin connection forming a joint between said frames, of power transmitting mechanism between the plow frame and the coupling device for releasing the latter by movement of the plow frame.

4. In an implement of the potato digging type, the combination with draft means, a coupling for said means and implement, a stationary carrier-frame, a movable plow frame alined with the carrier-frame, and a pivotal pin and slot joint between said frames, means for pivotally adjusting the plow frame, and power transmitting mechanism between the plow frame and the coupling whereby the latter is released by recession of the plow frame with relation to the carrier frame.

5. The combination in a potato-digging implement of the wheeled type with a main frame and a pair of axially alined wheels, of stub axles for the wheels, pivotal connections for the inner ends of said axles in said frame at opposite sides of its longitudinal center, an operating lever mounted on the frame, and power transmitting mechanism between said lever and the outer ends of said axles for steering the wheels.

BERT J. BATIE.